United States Patent [19]

Zhang et al.

[11] Patent Number: 5,549,041

[45] Date of Patent: Aug. 27, 1996

[54] BATCH MODE FOOD TREATMENT USING PULSED ELECTRIC FIELDS

[75] Inventors: Qinghua Zhang, Columbus, Ohio; Bai-Lin Qin; Gustavo V. Barbosa-Canovas, both of Pullman, Wash.; Barry G. Swanson; Patrick D. Pedrow, both of Moscow, Id.

[73] Assignee: Washington State University Research Foundation, Pullman, Wash.

[21] Appl. No.: 399,360

[22] Filed: Mar. 2, 1995

[51] Int. Cl.[6] ............................. A23L 3/00; A23L 3/26; A23L 3/32

[52] U.S. Cl. ......................... 99/451; 99/483; 99/DIG. 14

[58] Field of Search ...................... 99/451, 483, DIG. 14, 99/516, 536, 358; 426/234, 237, 238, 521, 410, 241, 407, 247, 248; 422/22–24; 219/700, 735; 392/338, 497

[56] References Cited

U.S. PATENT DOCUMENTS

| | | | |
|---|---|---|---|
| 4,331,691 | 5/1982 | Poovaiah et al. | 99/472 |
| 4,457,221 | 7/1984 | Geren . | |
| 4,608,920 | 9/1986 | Scheglov et al. | 99/451 |
| 4,695,472 | 9/1987 | Dunn et al. . | |
| 4,723,483 | 2/1988 | Papchenko et al. | 99/516 |
| 4,787,303 | 11/1988 | Papchenko et al. | 99/483 |
| 4,838,154 | 6/1989 | Dunn et al. . | |
| 4,871,559 | 10/1989 | Dunn et al. . | |
| 5,031,521 | 7/1991 | Grishko et al. | 99/483 |
| 5,034,235 | 7/1991 | Dunn et al. . | |
| 5,048,404 | 9/1991 | Bushnell et al. . | |
| 5,235,905 | 8/1993 | Bushnell et al. . | |
| 5,393,541 | 2/1995 | Bushnell et al. | 426/237 |
| 5,447,733 | 9/1995 | Bushnell et al. | 99/451 |

FOREIGN PATENT DOCUMENTS

| | | |
|---|---|---|
| 2513087 | 3/1983 | France . |
| 1237541 | 3/1967 | Germany . |
| 2526196 | 6/1975 | Germany . |
| 3-98565 | 4/1991 | Japan . |
| 1611320A1 | 12/1990 | U.S.S.R. . |

OTHER PUBLICATIONS

M. Allen and K. Soike; Sterilization by Electrohydraulic Treatment; Oct. 1966; *Science;* pp. 155–157.

R. Benz and U. Zimmermann; Pulse–Length Dependence of the Electrical Breakdown in Lipid Bilayer Membranes; *Biochimica et Biophysica Acta;* 1980; vol. 597; pp. 637–642.

R. Benz, F. Beckers, and U. Zimmermann; Reversible Electrical Breakdown in Lipid Bilayer Membranes: A Charge–Pulse Relaxation Study; 1979; *J. Membrane Biol.;* vol. 48; pp. 181–204.

G. Bryant and J. Wolfe; Electromechanical Stresses Produced in the Plasma Membranes of Suspended Cells by Applied Electrical Fields (1987); *J. Membrane Biol.;* vol. 96; pp. 129–139.

A. J. Castro, G. V. Barbosa–Cánovas and B. G. Swanson; Microbial Inactivation of Foods by Pulsed Electric Fields; 1993; *Journal of Food Processing and Preservation;* vol. 17; pp. 47–73.

(List continued on next page.)

*Primary Examiner*—Timothy F. Simone
*Attorney, Agent, or Firm*—Wells, St. John, Roberts, Gregory & Matkin, P.S.

[57] ABSTRACT

A batch food processing machine particularly adapted for treating solid and semi-solid foods. The machine has a processing vessel with first and second electrodes and an enclosed treatment chamber. The processing vessel is preferably a detachable module which is held within a vessel supporter and electrifier during treatment. The supporter-electrifier engages the electrodes and conveys high voltage electrical pulses to the electrodes. The system provides pressure relief using a preferred spring-biased pressure relief which is displaced when steam is generated within the treatment chamber. A preferred electrical pulse forming circuit applies square wave, short duration, high voltage pulses to the first and second electrodes with changing polarity.

36 Claims, 6 Drawing Sheets

OTHER PUBLICATIONS

D. C. Chang; Cell poration and cell fusion using an oscillating electric field; Oct. 1989; *Biophys. J.;* vol. 56; pp. 641–652.

D. C. Chang and T. S. Reese; Changes in membrane structure induced by electroporation as revealed by rapid-freezing electron microscopy; Jul. 1990; *Biophys. J.;* vol. 58, pp. 1–12.

H. G. L. Coster; A Quantitative Analysis of the Voltage-Current Relationships of Fixed Charge Membranes and the Associated Property of "Punch–Through"; 1965; *Biophys. J.;* vol. 5; pp. 669–686.

H. G. L. Coster and U. Zimmermann; The Mechanism of Electrical Breakdown in the Membranes of *Volonia utricularis;* 1975; *J. Mem. Biol.;* vol. 22, pp. 73–90.

H. G. L. Coster, E. Stuedle and U. Zimmermann; Turgor Pressure Sensing in Plant Cell Membranes; 1977; *Plant Physiol.;* vol. 58; pp. 636–643.

J. M. Crowley; Electrical Breakdown of Bimolecular Lipid Membranes as an Electromechanical Instability; 1973; *Biophys. J.;* vol. 13; pp. 771–724.

L. Dao–Sheng, R. D. Astumian, and T. Y. Tsong; Activation of Na and K Pumping Modes (Na, K)—ATPase by an Oscillating Electric Field; 1990; *J. Biol. Chem.* vol. 265; pp. 7260–7267.

D. S. Dimitrov; Electric Field–Induced Breakdown of Lipid Bilayer and Cell Membrane: A Thin Viscoelastic Film Model; 1984; *J. Membrane Biol.;* vol. 78; pp. 53–60.

D. S. Dimitrov and A. E. Sowers; 1990; Membrane Electroporation—Fast Molecular Exchange by Electroosmosis; *Biochem. Biophys. Act;* vol. 1022; pp. 381–392.

P. R. Elliker, E. L. Sing, L. J. Christensen, and W. E. Sandine; Psychrophilic Bacteria and Keeping Quality of Pasteurized Dairy Products; 1964; *J. Milk Food Technol.;* vol. 27; pp. 69–75.

J. C. Fetterman; The Electrical Conductivity Method of Processing Milk; 1928; *Agric. Eng.;* pp. 107–108.

B. E. Getchell; Electric Pasteurization of Milk; 1935; *Agric. Eng.* vol. 10; pp. 408–410.

S. E. Gilliland and M. L. Speck; Inactivation of Microorganisms by Electrohydraulic Shock; 1967a; *Appl. Microbiol.;* vol. 15(5); pp. 1033–1037.

S. E. Gilliland and M. L. Speck; Mechanism of the Bacterial Action Produced by Electrohydraulic Shock; 1967b; *Appl. Microbiol.;* vol. 15(5); pp. 1038–1044.

G. W. Gould; (Editor); New Methods of Food Preservation; 1995; *Plackie Academic & Professional;* London.

T. Grahl, W. Sitzmann, and H. Märkl; 102; Killing of microorganisms in fluid media by high–voltage pulses; Presented at the *10th Dechema Biotechnol. Conference Series 5B;* pp. 675–678.

D. Gross, L. M. Loew. and W. W. Webb; Optical Imaging of Cell Membrane Potential Changes Induced by Applied Electric Fields; 1986; *Biophys. J.;* vol. 50; pp. 339–348.

H. G. Hammon, S. Hitchcock, D. Spelts, and R. Shaw; Flexible Repetitive Pulser for Low–Temperature Pasteurization of Foods; 1994.

W. A. Hamilton, and A. J. H. Sale; Effects of High Electric Fields on Microorganisms II. Mechanism of Action of the Lethal Effect; 1967; *Biochem. Biophys. Acta;* vol. 148; pp. 789–800.

G. A. Hofmann; Cells in Electric Fields, Physical and Practical Electronic Aspects of Electro Cell Fusion and Electroporation. In "Electroporation and Electrofusion in Cell Biology"; 1989; Ed E. Neuman, A. E. Sowers and C. A. Jordan, Plenum Press, New York.

G. A. Hofmann, and E. A. Evans; Electronic Genetic—Physical and Biological Aspects of Cellular Electromanipulation; 1986; *IEEE Eng. Med. Biol.;* vol. 5; pp. 6–25.

H. Hülsheger and E. G. Niemann; Lethal Effects of High–Voltage Pulses on *E. coli* K12; 1980; *Radiation Environmental Biophysics;* vol. 18; pp. 281–288.

H. Hülsheger, J. Potel, and E. G. Niemann; Killing of Bacteria with Electric Pulses of High Field Strength; 1981; *Radiation Environmental Biophysics;* vol. 20; pp. 53–65.

H. Hülsheger, J. Potel and E. G. Niemann; Electric Field Effects on Bacteria and Yeast Cells; 1983; *Radiation Environmental Biophysics;* vol. 22; pp. 149–162.

H. E. Jacob, W. Förster, and H. Berg; Microbiological Implications of Electric Field Effects; 1981; *Z. Allg. Mikrobiol.;* vol. 21; pp. 225–233.

S. Jayaram, G. S. P. Castle, and A. Margaritis; Kinetics of Sterilization of *Lactobacillus brevis* Cells by the Application of High Voltage Pulses; 1992; *Biotech. Bioeng.;* vol. 40; pp. 1412–1420.

K. Kinosita, Jr. and T. Y. Tsong; Hemolysis of human erythrocytes by a transient electric field; 1977a; *Proc. Natl. Acad. Sci. USA;* vol. 74; pp. 1923–1927.

K. Kinosita, Jr. and T. Y. Tsong; Voltage–Induced Pore Formation and Hemolysis of Human Erythrocytes; 1977b; *Biochem. Biophys. Acta;* vol. 471; pp. 227–242.

K. Kinosita, Jr. and T. Y. Tsong; Voltage–Induced Conductance in Human Erythrocyte Membranes; 1979; *Biochem. Biophys. Acta;* vol. 554; pp. 479–497.

E. H. Marth; Official Methods of Analysis of the Association of Official Analytical Chemists; 1978.

O. Martin, Q. Zhang, A. J. Castro, G. V. Barbosa–Cánovas, and B. G. Swanson; Pulse Electric Fields of High Voltage to Preserve Foods. Microbiological and Engineering Aspects of the Process; 1994; *Spanish Journal of Food Science and Technology* 34:1–34.

Y. Matsumoto, T. Satake, N. Shioji, and A. Sakuma; Inactivation of Microorganisms by Pulsed High Voltage Applications; 1991; *IEEE Ind. Appl. Conf. Proc.;* pp. 652–659.

B. Metens and D. Knorr; Developments of Nonthermal Processes for Food Preservation; *Food Technology;* vol. 46(5); pp. 124–133, date unknown.

A. Mizuno and Y. Hori; Destruction of Living Cells by Pulsed High–Voltage Application; 1988; *IEEE Trans. Ind. Applic.;* vol. 4; pp. 387–394.

D. Moses; Electric pasteurization of milk; 1938 *Agric. Eng.* vol. 19; pp. 525–526.

E. Neumann and K. Rosenheck; Permeability Changes Induced by Electric Impulses in Vesicular Membranes; 1972; *J. Membrane Biol.;* vol. 10; pp. 279–290.

S. Palaniappan, S. K. Sastry, and E. R. Richter; Effects of Electricity on Microorganisms; A Review; 1990; *J. Food Processing and Preservation;* vol. 14; pp. 393–414.

U. R. Pothakamury, G. V. Barbosa–Cánovas, and B. G. Swanson; Magnetic–Field Inactivation of Microorganisms and Generation of Biological Changes; 1993; *Food Technology;* vol. 47(12); pp. 85–93.

U. R. Pothakamury, A. Monsalve–González, and G. V. Barbosa–Cánovas; High voltage pulsed electric field inactivation of *Bacillus subtilis* and *Lactobacillus delbrueckii*; 1995; *Spanish Journal of Food Science and Technology;* pp. 101–107.

U. R. Pothakamury, A. Monslave–González, and G. V. Barbosa–Cánovas; Inactivation of *Escherichia coli* and *Staphylococcus aureus* in model foods by pulsed electric field technology; 1995; *Food Research International;* pp. 167–171.

M. Rüegg; U. Moor, and B. Blanc; A calorimetric study of the thermal denaturation of whey proteins in simulated milk ultrafiltrate; 1977; *Journal of Dairy Research;* vol. 44; pp. 509–520.

A. J. H. Sale and W. A. Hamilton; Effects of High Electric Fields on Microorganisms. I. Killing of Bacteria and Yeast; 1967; *Biochem. Biophys. Acta.* 148:781–788.

A. J. H. Sale and W. A. Hamilton; 1968; Effects of High Electric Fields on Microorganisms III. Lysis of Erythrocytes and Protoplasts; *Biochem. Biophys. Acta.;* vol. 163; pp. 37–43.

M. Sato. K. Tokita, M. Sadakata, and T. Sakai; 1988; Sterilization of Microorganisms by High–Voltage Pulsed Discharge under Water; *Kagaku Kogaku Ronbunshu;* vol. 4; pp. 556–559.

W. Sitzmann; Keimabtotung mit Hilfe elecktrischer Hochspannungsimpulse in pumpfahigen Nahrungsmitteln; 1990; *Vortrag analblich des Seminars* "Mittelstansforderung in der Biotechnologie." Ergebnisse des etc.; pp. 6 and 7.

W. Sitzmann; 1995; High–voltage pulse techniques for food preservation; in *New Methods of Food Preservation* (Edited by G. W. Gould); Plackie Academic & Professional, London, pp. 236–252.

G. A. Somkuti and D. H. Steinberg; Genetic transformation of *Streptococcus thermophilus* by electroporation; 1988; *Biochemie.;* vol. 70; pp. 579–585.

A. E. Sower; A Long–lived Fusogenic State is Induced in Erythrocyte Ghosts by Electric Pulses; 1986; *J. Cell Biol.;* vol. 102; pp. 1358–1362.

Q. Zhang, A. Monslave–González, B. L. Qin, G. V. Barbosa–Cánovas, and B. G. Swanson; Inactivation ofo *Saccharomyces cerevisiae* in Apple Juice by Square Wave and Exponential–Decay Pulsed Electric Fields; 1994; *J. Food Process Engr.;* vol. 17; pp. 469–478.

Q. Zhang, F. H. Chang, G. V. Barbosa–Cánovas, and B. G. Swanson; 1994; Inactivation of Microorganisms in Semi-solid Model Food Using High Voltage Pulsed Electric Fields; *Food Science and Technology* (LWT); vol. 27(6);pp. 538–543.

Q. Zhang, A. Monsalve–González, G. V. Barbosa–Cánovas, and B. G. Swanson; Inactivation of *E. coli l and S. cerevisiae* by Pulsed Electric Fields Under Controlled Temperature Conditions; 1994; *Trans. of American Society of Agricultural Engineers;* vol. 37(2); pp. 581–587.

U. Zimmermann, J. Schulz, and G. Pilwat; Transcellular Ion Flow in *Escherichia coli* B and Electrical Sizing of Bacterias; 1973; *Biophys. J.;* vol. 13; pp. 1005–1013.

U. Zimmermann, G. Pilwat, and F. Riemann; Dielectric breakdown of cell membranes; 1974; *Biophys. J.;* vol. 14; pp. 881–889.

U. Zimmermann, G. Pilwat, and F. Riemann; Preparation of Erythrocyte Ghosts by Dielectric Breakdown of the Cell Membrane; 1975; *Biochem. Biophys. Acta;* vol. 375; pp. 209–219.

U. Zimmermann, G. Pilwat, F. Beckers, and F. Riemann; 1976; Effects of External Electric Fields on Cell Membranes; *Bioelectrochem. Bioenerg.;* vol. 3; pp. 58–83.

U. Zimmermann, J. Vienken, and G. Pilwat; Development of Drug Carrier Systems: Electrical Field Induced Effects in Cell Membranes; 1980; *Bioelectrochem. Bioenerg.;* vol. 7; pp. 553–574.

U. Zimmermann and R. Benz; Dependence of the Electrical Breakdown Voltage on the Charging Time in *Valonia utricularis;* 1980b; *J. Membrane Biol.;* vol. 53; pp. 33–43.

U. Zimmermann and J. Vienken; Electric Field–Induced Cell–to–Cell Fusion; 1982; *J. Membrane Biol.;* vol. 67; pp. 165–182.

U. Zimmermann; Electrical Breakdown, Electropermeabilization and Electrofusion; 1986; *Rev. Physiol. Biochem. Pharmacol.;* vol. 105; pp. 175–256.

BATCH MODE FOOD TREATMENT USING PULSED ELECTRIC FIELDS

TECHNICAL FIELD

The technical field of this invention is batch mode treatment of food products by applying pulsed electrical fields for purposes of inhibiting or preventing microbial growth.

BACKGROUND OF THE INVENTION

It has previously been known that electrical pulses can be used to provide antimicrobial treatment for food products. Prior food treatment systems include batch mode and flow-through processors. The processors contained first and second electrodes which were charged to high voltages. The high voltage electrodes create high electrical field strengths across a space extending between the electrodes. Field strengths of 5–100 kilovolts per centimeter have been reported.

The processes of the prior art are indicated for use in applying pulsed electric fields to juices, liquid egg products, and other types of pumpable foods. In such systems the electrical treatment is combined with a heat treatment to improve microbial inactivation. This approach in essence combines heat pasteurization with electrical pulse treatment to inactivate microbial populations. However, the use of heat processing necessarily has significant and sometimes derogatory effects upon the taste, color, and other properties of the resultant food products. Thus there is a need for improved processes which do not require combined elevated heat treatment and electrical pulse treatment to accomplish suitable inactivation of microbes.

Prior art electrical pulse treatment systems have also been flawed in having processing chamber designs and methods which result in accumulations of materials such as organic molecules upon the electrodes. Such accumulations can cause fouling of the processor flow channels. More typically, the fouling will affect the properties of the electrical field emanating from the electrodes and their interaction with the fluid being processed. This can lead to non-uniform pulse distribution into the product, which in turn can result in inadequate microbial inactivation. Fouling of processor electrodes can also result in increasing heat buildup at the electrodes. This heat buildup further exacerbates the fouling of the electrodes.

Prior art systems have also utilized exponentially decaying wave forms for the electrical pulses supplied to the electrodes. Such exponentially decaying pulse shapes fail to fully utilize the energy being supplied in a manner which is effective at inactivating the microbes. The prior art systems further have generally used pulse generators which are relatively expensive to build and operate. This has been a drawback to adoption of electrical pulse treatment of food products.

Prior art pulsed electrical field food processors have also been used primarily for liquid food products which flow or can be pumped. The treatment of solid and semi-solid foods poses additional complexity with regard to possible microbial inactivation. The increased difficulty in treating solid and semi-solid foods using pulsed electric fields is believed to in part be due to the presence within such foods of large numbers of various ionic species. The number of ionic species also reduces the resistivity of the food making treatment using pulsed electric fields more difficult.

Thus there remains a need for an improved food processor which can effectively inhibit microbial growth within food products without adversely affecting the taste, color, appearance, and smell of the food product being treated. Other objects and advantages will be indicated in the remaining text of this document.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
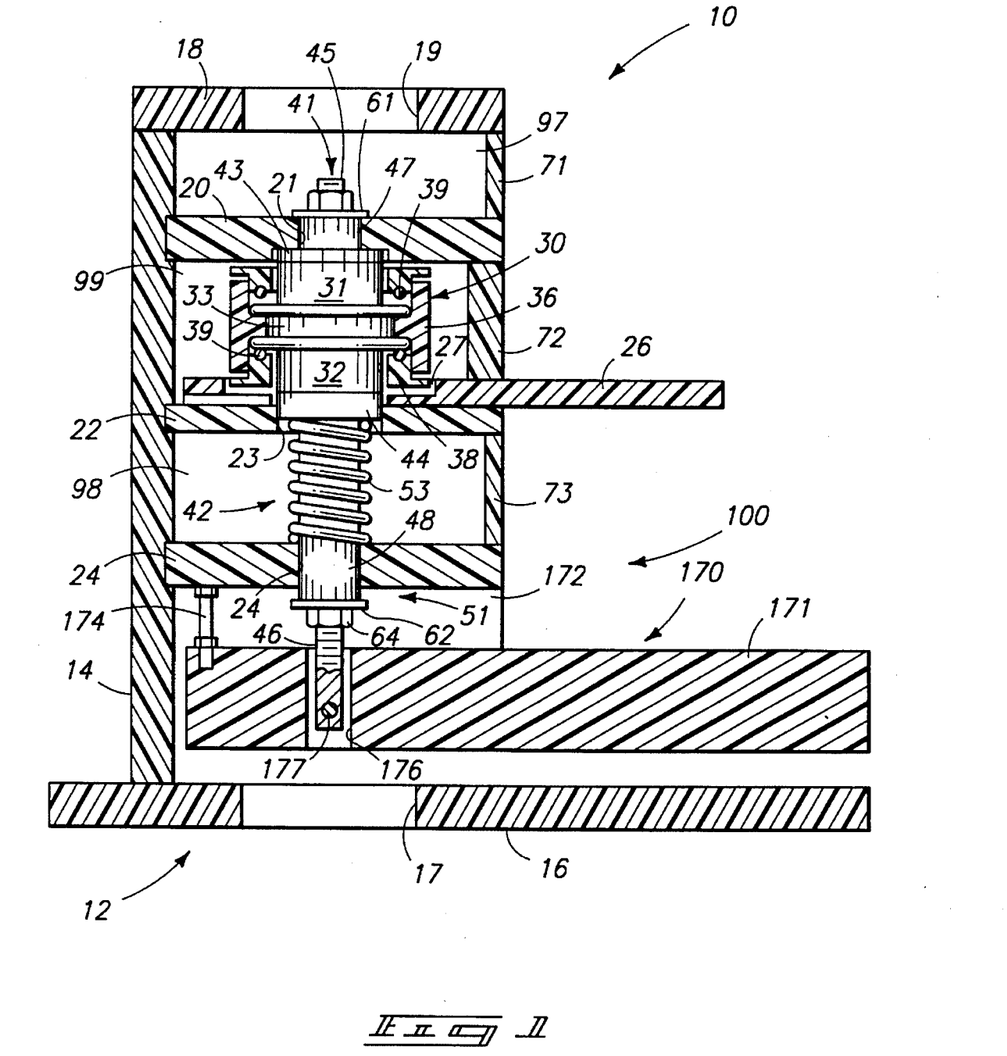
FIG. 1 is a side sectional view showing a preferred food processing machine according to this invention.
Figure 5:
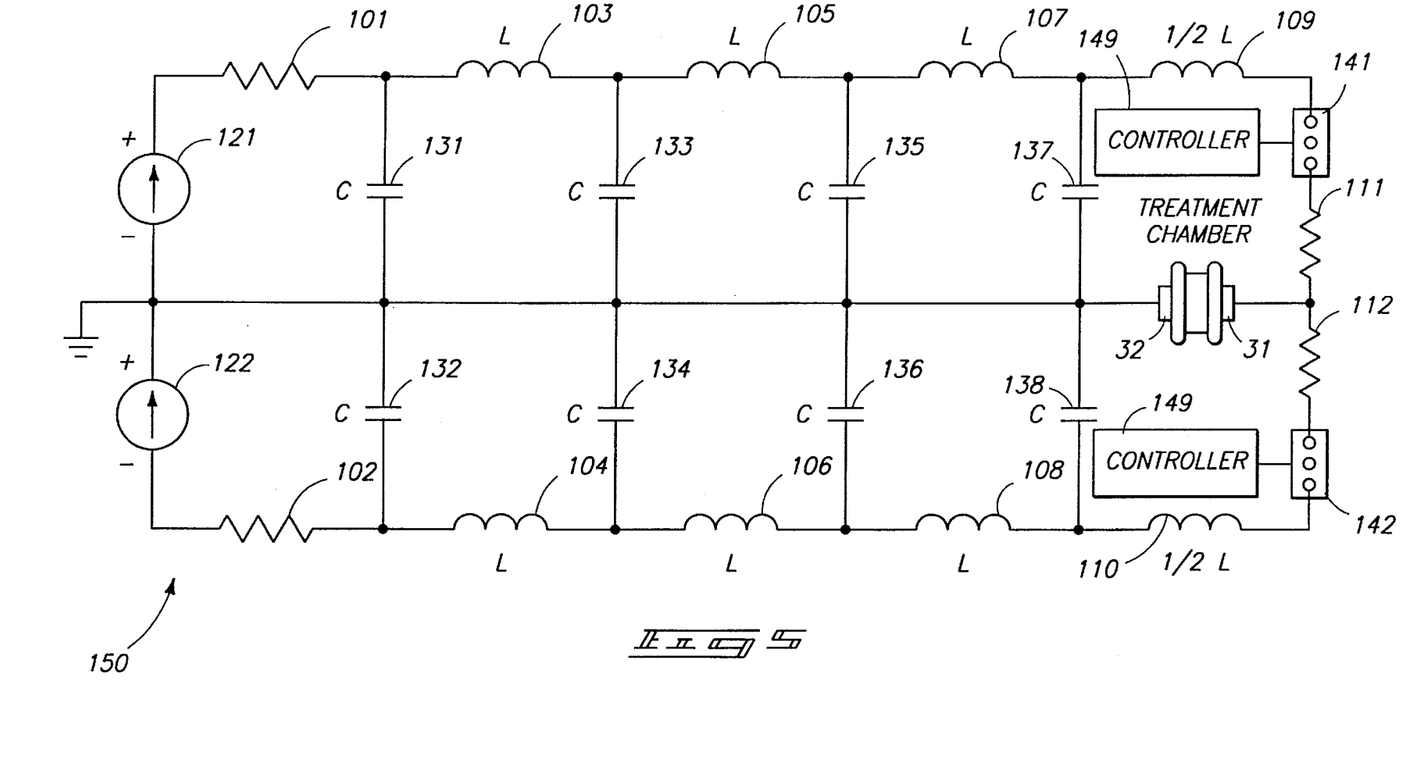
FIG. 5 is an electrical schematic view of a preferred pulse forming circuit used to charge the electrodes of the food processing machine shown in FIG. 1.

FIG. 1 shows a preferred food processor 10 made in accordance with this invention. As shown, food processor 10 is constructed in two basic parts. The first part is a processing vessel 30 which is advantageously made as a detachable module. The processing vessel is held within a supporting electrifier 100 which applies pulsed electrical fields to the food being processed. The supporting electrifier mechanically supports the processing vessel and makes electrical contact with two electrodes which advantageously form a part of the processing vessel. The preferred supporting electrifier also includes portions of a pressure relief which biases a movable wall of the processing vessel thus allowing any steam generated within processing chamber 33 to automatically escape. The electrifier also includes a pulse forming circuit 150 (FIG. 5). The pulse forming circuit generates electrical pulses which are conducted to the processing vessel and used to create the electrical fields applied to the food being treated.

Figure 3:
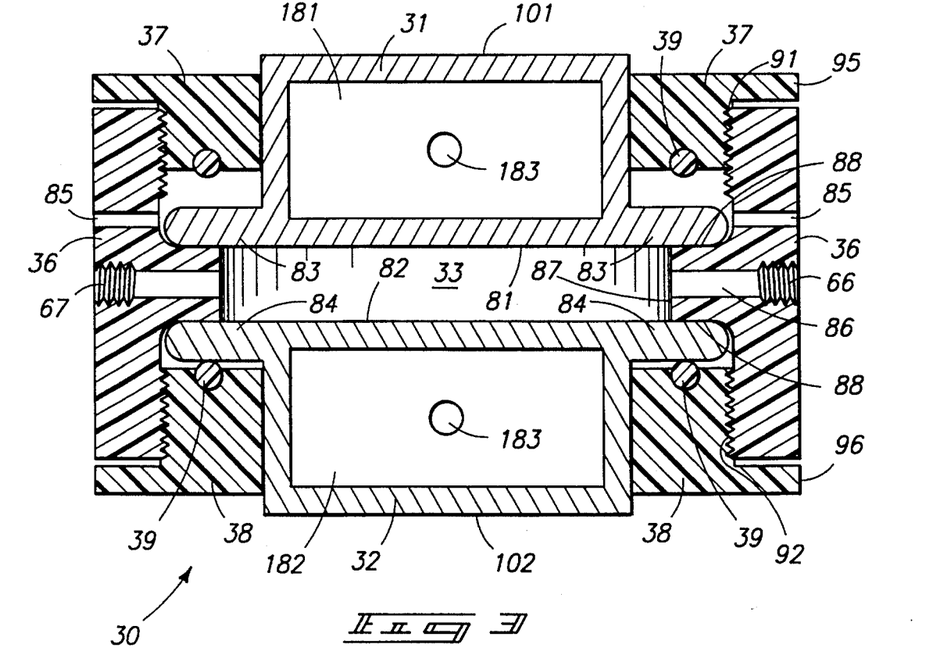
FIG. 3 is an enlarged sectional view of the processing vessel forming a part of the machine shown in FIG. 1.

FIG. 3 shows processing vessel 30 in isolation. Processing vessel 30 surrounds and substantially confines a processing or treatment chamber 33. As shown, the processing vessel advantageously includes a first electrode member 31 and a second electrode member 32. In the preferred construction, the first and second electrodes define the upper and lower walls of the processing chamber. Electrodes 31 and 32 have electrode head portions with inner or treatment chamber faces 81 and 82 which face inwardly toward the treatment chamber. The electrode heads also have associated flanges 83 and 84 which are enlarged relative to the main parts of the electrodes. The treatment chamber or proximate faces of the electrodes are most preferably configured in spaced parallel relationship. The spaced parallel electrode faces provide a relatively uniform electrical field strength across the entire treatment chamber.

FIG. 3 also shows that processing vessel 30 includes a side wall or main member 36. Side wall member 36 is preferably formed as a ring-shaped or annular piece having a spacer extension 86. The inner surface of spacer extension 86 forms a side wall 87 of the treatment chamber. The side wall 87 is preferably inward of the electrode peripheries to further aid in providing a uniform electrical field within the processing chamber 33. Extension 86 has abutment or seating surfaces 88 against which the electrode head inner faces 81 and 82 abut and seat to form a substantially confined processing chamber.

The main processing vessel member 36 is advantageously provided with two side ports 66 and 67. Ports 66 and 67 can be used to move liquid food products to and from the process chamber 33. Ports 66 and 67 or a further similar port can also be used to mount a temperature measuring sensor for monitoring temperature of the food contained within treatment chamber 33.

The first electrode member 31 is preferably connected to the processing vessel assembly so as to allow relative motion between the electrode and other portions of the processing vessel. This movement capability allows the electrode to be displaced when incidental steam generation occurs in the processing chamber. The relative movement capability is advantageously accomplished by having a clearance fit between the electrode head flange 83 and the first receptacle 91 formed in the upper portion of the processing vessel main piece 36. The inner face 81 of the first electrode seats against the first receptacle seating or abutment surface 88 on extension 86.

A first mounting ring 37 surrounds the main part of first electrode 31; however, it is not tightened and is positioned so as to allow the first electrode to move relative to other parts of the processing vessel when internal treatment chamber pressures exceed a threshold release pressure. An 0-ring seal 39 is provided upon the inward face of mounting ring 37. The outer or distal part of mounting ring 37 is advantageously provided with a distal flange 95.

Figure 4:
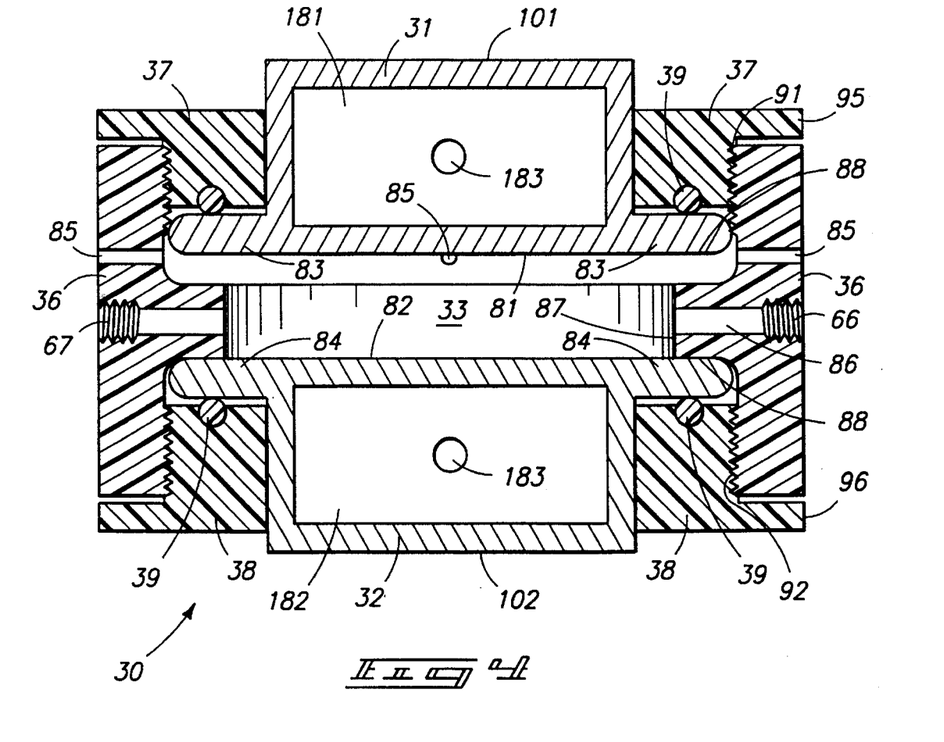
FIG. 4 is an enlarged sectional view similar to FIG. 3 with the movable pressure relief opened to allow escape of steam from the processing chamber.

FIG. 4 shows the processing vessel with the first electrode displaced upwardly relative to other parts of the vessel. This provides an open pressure relieving position. Pressure escapes outwardly around the periphery of the flanged head 83. Steam moves outwardly through the port holes 85 built in sidewall member 36 slightly above the seating surface 88.

The second electrode member 32 is preferably mounted to other parts of the processing vessel and held in a secured position relative to side wall member 36 using a second electrode mounting ring 38. Mounting ring 38 is advantageously threaded and received by complementary threads formed in the second receptacle 92 of main or central vessel member 36. The inner face of mounting ring 38 is preferably provided with an 0-ring seal 39 which seals against the outer or back surface of electrode head flange 84. The outer or distal part of mounting ring 38 is advantageously provided with a distal flange 96.

Figure 2:
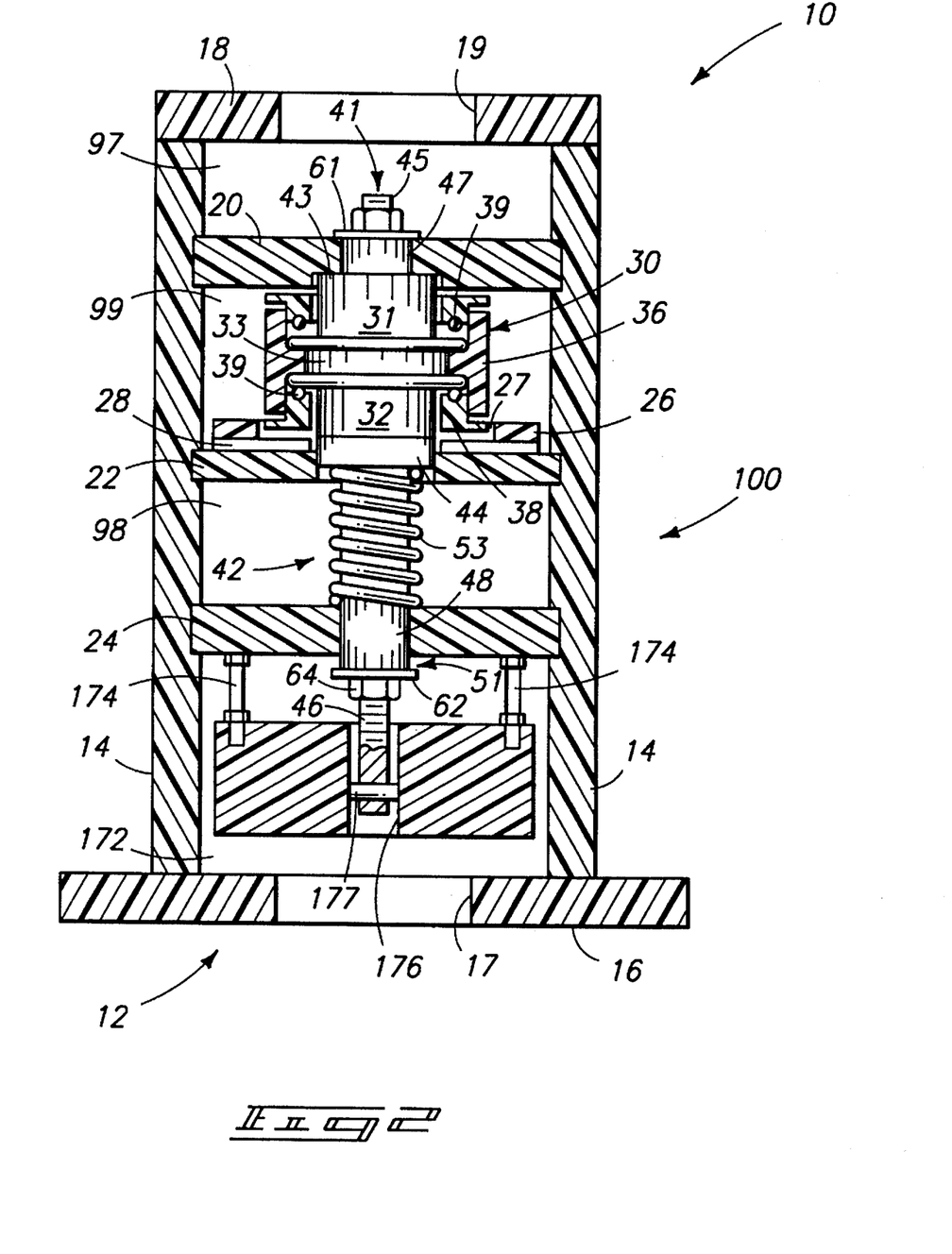
FIG. 2 is a front sectional view showing the food processing machine of FIG. 1.

FIG. 3 shows outer contact faces 101 and 102 on electrodes 31 and 32. The outer contact faces 101 and 102 are contacted and supported by first and second support and contact members 41 and 42, as shown in FIGS. 1 and 2.

FIG. 3 also shows that the preferred electrodes 31 and 32 have internal cooling chambers 181 and 182. Chambers 181 and 182 are supplied with a temperature stabilizing fluid which is circulated therethrough. Inlet and outlet ports 183 are formed in opposing sides of the electrodes, and coolant or other temperature stabilizing fluid is passed through the electrodes. In typical situations water is passed through the electrodes at a desired temperature to cool the electrodes and processing chamber to thus prevent degradation of the food product as could occur due to overheating.

The supporting electrifier 100 includes a frame which is generally referred to as frame or framework 12. Frame 12 advantageously includes a base 16 and a main support tower 14. The support tower has a top piece 18 which beneficially includes a top opening 19. Base 16 has a base opening 17. Openings 17 and 19 allow electrode power supply wires (not shown) to extend through the openings for connection to first and second support and contact members 41 and 42.

The tower portion of the frame also includes a first or upper electrode support shelf or panel 20. First shelf 20 is secured to tower main piece 14. As shown, shelf 20 is secured by being received within a receiving groove formed in the inside wall of main piece 14. Shelf is also preferably held therein using an adhesive bond. Similar mounting arrangements are used for other shelves described below.

First shelf 20 is preferably provided with a mounting feature which allows a first electrode contact and support member 41 to be supported at a desired position and orientation. As shown, upper shelf 20 is provided with an aperture 21 which extends through the shelf to receive contact member 41 in a stationary relationship to the frame. Aperture 21 is preferably provided with a shoulder against which a flanged portion 43 of electrode contact member 41 bears. First electrode contact and support member 41 also has a main section 47 and a threaded stem 45. Threaded stem 45 receives a connection end 61 and threaded nut 63. First connection end nut 63 holds the first connection end 61 securely to the first contact member 41 to provide good electrical conduction. Electrical pulses are supplied from a pulse forming circuit 150 (FIG. 5), as described below. The electrical pulses are supplied to first contact member 41 via wires (not shown) and connection end 61.

Frame 12 also includes features which movably support the processing vessel 30. As shown, the second electrode contact and support member 42 is slidably mounted to the frame using an upper or second support shelf or panel 22, and a lower or third support shelf 24. Second and third shelves 22 and 24 are respectively provided with apertures 23 and 24 which acts as guides for contact member 42. Aperture 23 in shelf 22 is sized to slidably receive second contact member head or flange portion 44. Aperture 24 is sized to slidably receive the main section 48 of contact member 42. Second contact member 42 is also preferably provided with a threaded stem portion 46 which receives a second connection end 62 and associated second nut 64. Second connection nut 64 holds the second connection end 62 securely to the second contact and support member 42 to provide good electrical conduction.

A biasing spring 53 is captured between the upper surface of third shelf 24 and the flanged head 44 of the second electrode contact and support member 42. Spring 53 urges the contact head 44 against the lower contact face 102 of the second electrode. The processing vessel assembly 30 is generally biased upwardly by spring 53. This forces contact face 101 on the upper side of electrode 31 against the lower contacting face of the first electrode support and contact member 41.

The first electrode 31 forms a wall of the processing chamber which is capable of movement in relation to the remaining portions of the processing vessel. This construction allows steam pressure which can incidentally be generated within treatment chamber 33 to escape thus preventing dangerous treatment chamber pressures from occurring. The supporting electrifier is provided with the spring biased second electrode contact member 42 to thus form and provide a treatment chamber pressure relief mechanism. The movable electrode or other wall of the processing chamber also forms an operable part of the treatment chamber pressure relief.

FIGS. 1 and 2 further show that the main tower piece 14 extends along the back and opposing sides of the frame tower. The first shelf 20 advantageously is also provided with a front cowling piece 71 which covers frontal portions of an upper bay 97. The second shelf supports a processing chamber rest member 26. A second cowling piece 72 covers frontal portions of the processing vessel bay 99. The third shelf 24 supports a third cowling piece 73 which covers frontal portions of a third or spring bay 98. Cowling pieces 71–73 are preferably detachable to facilitate operation and maintenance.

FIGS. 1 and 2 show that the preferred processing vessel rest member 26 has a rest receptacle 27. In use the processing vessel 30 can be filled by placing food into treatment chamber 33. Assembly of the vessel is then completed and the processing vessel is then set into the rest receptacle 27. The rest member and supported processing vessel can then be inserted into processing bay 99 of the electrifier. The rest member and processing vessel are positioned so that the upper and lower support and contact members 41 and 42 are in juxtaposition with the outer contacting faces 101 and 102 of the electrodes.

The supporting electrifier is also preferably provided with a spring deformer or displacer 170. Displacer 170 has a displacement lever arm 171 which extends from the lower bay 172 of the support tower. Lever arm 171 is connected to the tower, such as using threaded fulcrum pieces 174. As shown, pieces 174 are held in the lower part of the third shelf. The fulcrum pieces are advantageously made from a tough but flexible dielectric material such as nylon. The lever arm 171 has a receiving aperture 176 which receives the lower end of the second contact member 42. A pivot pin 177 extends through a hole in the stem portion 46 and is connected to the lever arm 171 within aperture 176. Downward force at the distal end of lever arm 171 causes the second contact member 42 to be displaced downwardly compressing spring 53 and moving the upper head 44 at or near the level of the second shelf. This facilitates insertion of the processing vessel. After the processing vessel is properly aligned, the downward force on lever arm 171 is released and the spring biases the contact head 44 into the second electrode. This in turn forces the first electrode against the first contact member 41. It also preloads the movable second electrode wall of the processing chamber such that a predetermined relief or release pressure threshold must be developed within the treatment chamber 33 in order to displace the vessel 30 downwardly relative to electrode 31 and thereby release pressure. The specific relief pressure threshold will be determined by the size of the system and the spring rate of spring 53. In a preferred form of this invention, the threshold relief pressure will be approximately 5–10 pounds per square inch gauge pressure.

FIG. 5 shows the preferred pulse forming circuit 150 used in supporting electrifier 100. Circuit 150 includes two analogous halves which have similar parts and connection relationship to the treatment chamber electrodes 31 and 32. The upper half generates positive pulses and the lower half generates negative pulses. As shown, circuit 150 has first and second power supplies 121 and 122. Power supplies 121 and 122 are command charging high voltage power supplies. The ground or common connections of positive power supply 121 is connected to ground and to the second electrode 32. The positive terminal of power supply 121 is connected to resistor 101. The positive terminal of negative power supply 122 is connected to ground and to second electrode 32. The negative terminal of power supply 122 is connected to resistor 102. The power supplies cause the first electrode 31 to be charged to positive and negative potentials relative to ground and the second electrode.

The respective positive and negative outputs of power supplies 121 and 122 are connected to the first terminals of charging resistors 101 and 102 to provide positive and negative current thereto. The second terminals of resistors 101 and 102 are connected to first terminals of inductors 103 and 104. The opposing second terminals of resistors 101 and 102 are also connected to first terminals of capacitors 131 and 132. The second terminals of capacitors 131 and 132 are connected to ground and the second electrode 32.

The second terminals of inductors 103 and 104 are connected to the first terminals of inductors 105 and 106. These nodes are also connected to the first terminals of capacitors 133 and 134. The second terminals of capacitors 133 and 134 are connected to ground and the second electrode 32. The second terminals of inductors 105 and 106 are similarly connected to the first terminals of inductors 107 and 108, and to the first terminals of capacitors 135 and 136. The second terminals of capacitors 135 and 136 are connected to the second electrode. The second terminals of inductors 107 and 108 are connected in a similar fashion to the first terminals of inductors 109 and 110. The second terminals of inductors 107 and 108 are also connected to the first terminals of capacitors 137 and 138. The second terminals of capacitors 137 and 138 are connected to the second electrode 32 and to ground.

The second terminals of inductors 109 and 110 are connected to high voltage switches 141 and 142. Switches 141 and 142 are advantageously connected to a controller 149 which is programmed to provide the desired pulse duration and frequency, and desired number of pulses. Controller 149 can be a variety of industrial controllers or a general purpose computer. The output terminals of high voltage switches 141 and 142 are preferably connected to the first terminals of resistors 111 and 112. The second terminals of resistors 111 and 112 are connected to the first electrode 31. Electrodes 31 and 32 are preferably connected via the contact members 41 and 42 which are not shown in FIG. 5 for simplicity.

The values of resistance, inductance and capacitance used in the pulse forming circuit 150 will necessarily vary dependent upon the size and electrical requirements of the system being built. However, typical value ranges will be given below for a processing chamber having a preferred electrode treatment chamber surface area of approximately 5 square inches (~32 square centimeters), and electrode spacing across the treatment chamber of approximate 0.38 inches (~10 millimeters). The resultant treatment chamber capacity was approximately 1.8 cubic inches (~30 cubic centimeters). Charging resistors 101 and 102 typically will have resistance values in the approximate range of 100 ohms–2 megohms. The capacitors and inductors form a network having matched output impedance with respect to the effective resistance of foods inside the treatment chamber. Capacitances in the approximate range of 0.1–0.5 microfarad are suitable. Inductances L are advantageously in the approximate range of 5–20 microhenries. Inductors 109 and 110 preferably have inductance values equal to one-half of the remaining inductors. Resistors 111 and 112 are current limiting resistors having a suitable low resistance, such as 0.2 ohm.

In operation the high voltage discharge switches 141 and 142 are controlled so that only one switch is conductive at any given time. The switches are preferably rendered conductive for pulse duration periods approximately in the range of 100 nanoseconds to 20 microseconds, more preferably 100 nanoseconds to 5 microseconds. The frequency of the pulses can be varied significantly; however, it has been found preferably to have both a positive polarity pulse and a negative polarity pulse every 10–100 milliseconds. This corresponds to a frequency of 10–100 cycles per second. Frequencies of 1–100 Hz are possible. The pulses produced are approximately square wave pulses. Voltage output of the power supplies is selected to provide pulsed electric fields between electrodes 31 and 32 which are in approximate range of 20–100 kilovolts per centimeter. In one embodiment the power supplies provide outputs of 100,000 volts to produce electric fields of approximately 40,000 volts per centimeter.

Figure 6:
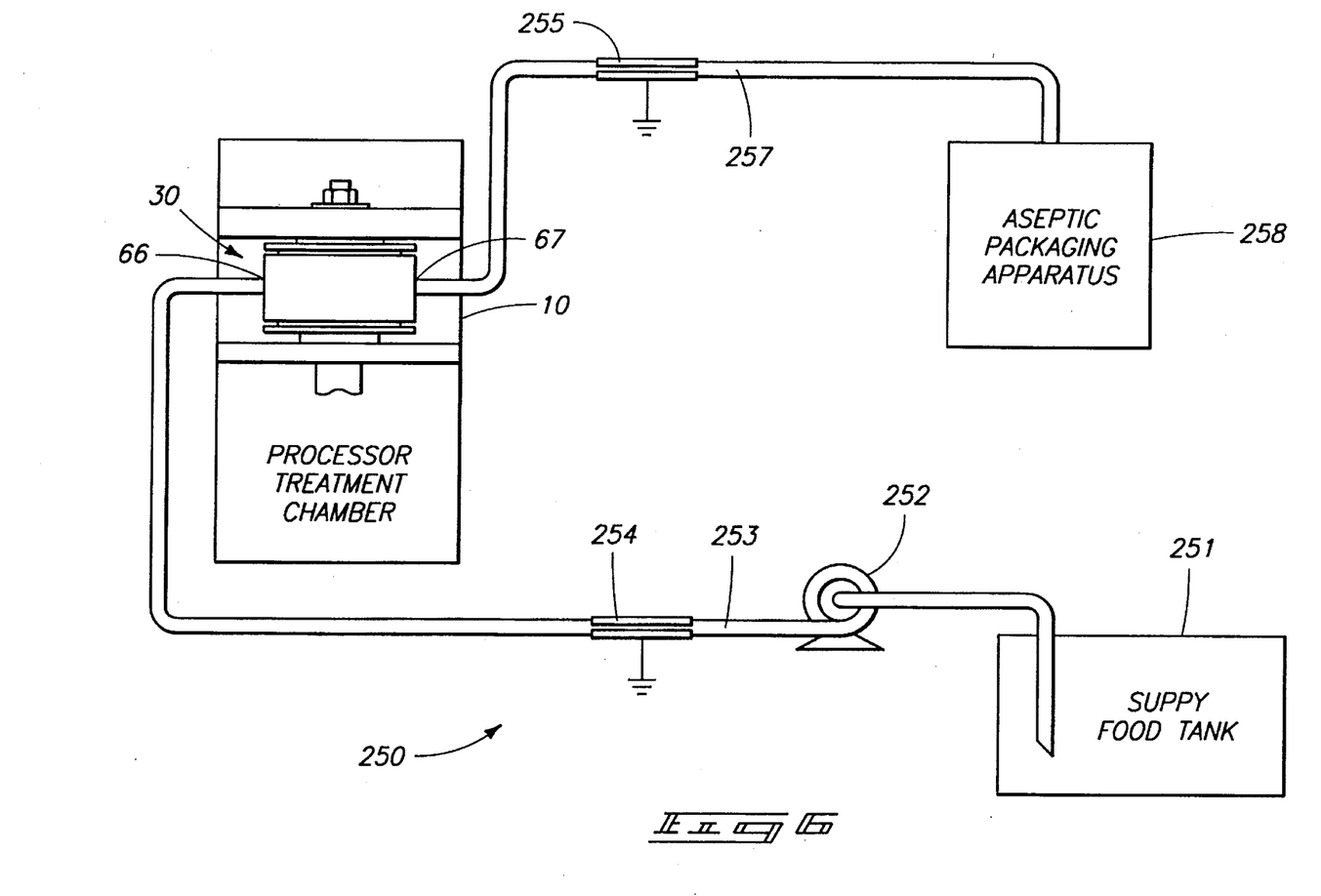
FIG. 6 is a schematic fluid diagram showing a preferred system according to this invention which includes the food processor of FIG. 1.

FIG. 6 shows a further form of the invention. The processing system 250 includes processor 10 as described above. Food product is taken from supply tank 251 using pump 252. The outflow from food pump 252 is passed through an unprocessed food supply line 253. Supply line 235 is made of an electrically non-conductive material such as plastic. An inlet electrical shield flow connector 254 is included between pump 252 and processor food product inlet ports 21. Shield 254 is an electrically conductive conduit which is grounded. Shield 254 is of sufficient length to fully dissipate any current which may be conducted from processor 10 via the food product. The particular requirements of each system and the conductivity of the food being processed will indicate the required length of the shield connector. In installations using approximately 25 kV electrode voltages and 1 centimeter diameter supply tubing, a shield connector length of approximately 5–10 centimeters will be sufficient for many typical liquid food products.

FIG. 6 also shows an outflow shield connector 255 which is of construction similar to shield 254. Shield 255 is positioned in the outflow line 257.

FIG. 6 further shows that the outflow line 257 is preferably connected to an aseptic packaging system 258 which takes the electrical pulse treated flowable food product and packages such for storage, distribution and use by the consumer. Outflow line 257 is made of an electrically non-conductive material such as plastic.

Figure 7:
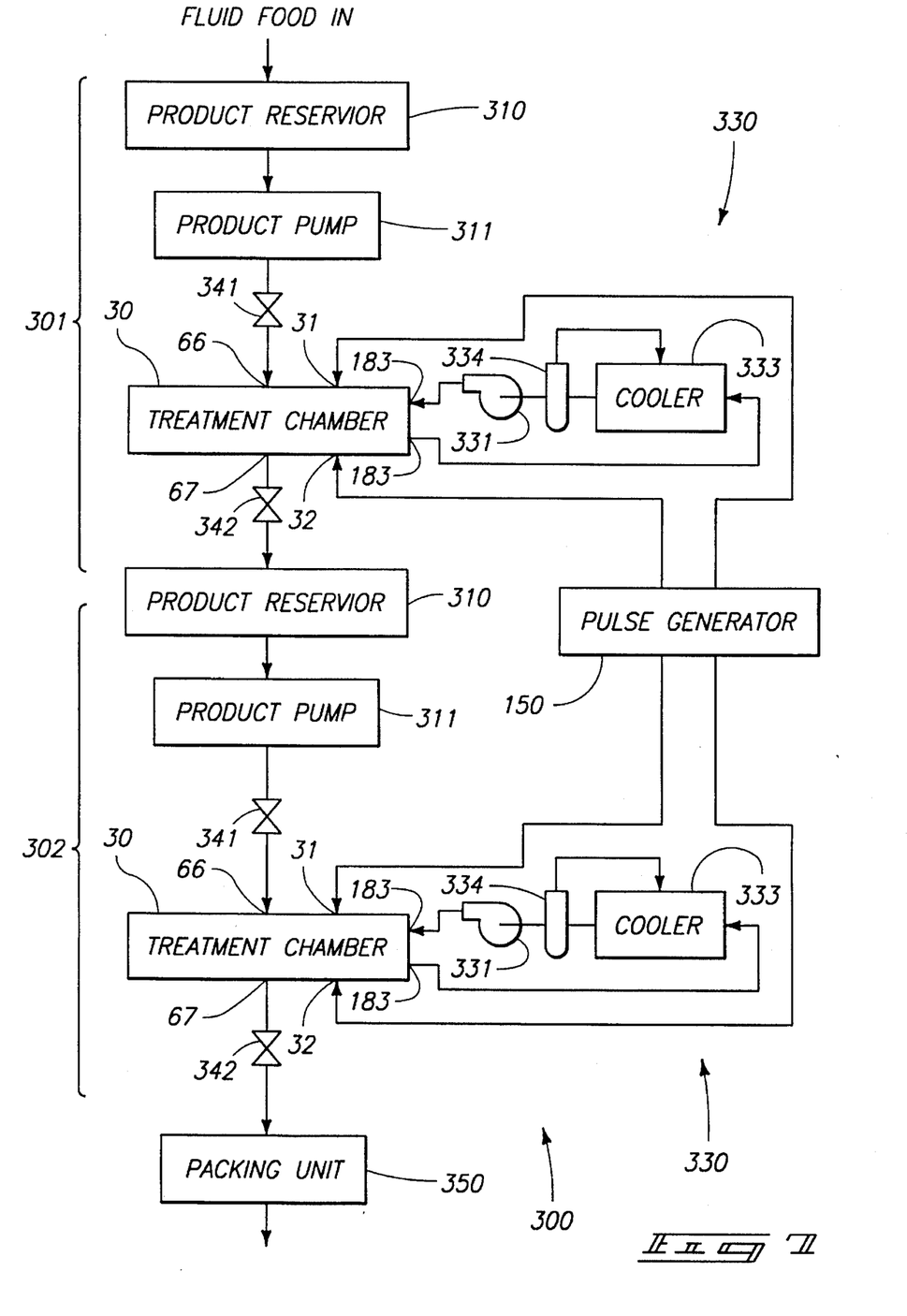
FIG. 7 is a schematic fluid diagram showing a further preferred system according to this invention which includes the food processor of FIG. 1.

FIG. 7 shows a further system in accordance with this invention. System 300 is a multistage batch mode food processing system. Two stages 301 and 302 are shown. Additional stages can also be added to increase the number of times the food product is treated using the electrical pulses.

The first stage 301 preferably includes a product reservoir 310. Flowable food product from reservoir 310 is pumped by first stage pump 311 to processor 10 for treatment in the internal treatment chamber 30. Flow to the treatment chamber 30 is controlled by control valve 341. Flow from treatment chamber 30 is controlled by control valve 342. Electrical pulses are supplied from pulse generator 150 to processor electrodes 31 and 32. The reservoirs 310 are used to buffer the foods between treatments. They also act as incubators that give rise to microbial growth which thus renders the microbes in condition for successful inactivation by the pulsed electrical field treatment. Reservoirs 310 are also believed to affect the ability of the microbes to successfully go through repair mechanisms seeking recovery from the effects of electrical pulse inactivation.

FIG. 7 further shows temperature stabilizing heat transfer subsystems 330 which form parts of stages 301 and 302. The temperature stabilizing subsystems include a coolant or temperature stabilizing recirculation pump 331. Coolant or other heat transfer fluid, such as water, is recirculated or otherwise supplied to the inlet ports 183 of the electrodes. The heat transfer fluid exits from outlet ports 183. The exiting heat transfer fluid is run through a cooler or other heat exchanger 333. Cooler 333 is preferably controlled by a thermostat 334 which measures the temperature of the heat transfer fluid as it exits unit 333 and controls the fluid to a desired temperature.

This construction provides a stabilized temperature for both electrodes which assists in preventing food residue buildup on the electrodes. It also stabilizes the electrode temperatures to maintain uniform processing temperatures and uniform electrode temperatures for improved operation.

FIG. 7 also indicates that the second stage 302 is constructed the same as first stage 301. The outflow from second stage 302 is preferably supplied to additional similar processing stages, or to a packaging unit, such as an aseptic packaging unit 350 for packaging in a desired form. The additional stage or further stages allow batch mode processing at each stage. However, the position of the microbes within the treatment chamber are changed due to the inherent agitation associated with removing the treated product from the first stage and supplying it to the second stage. This prevents the microbes from effectively hiding within the complex mix of food components, thus increasing the inactivation of microbes and improving treatment performance.

The processing apparatus described above is preferably constructed of a suitable dielectric material, such as Plexiglas synthetic resin, except for the electrically conductive contact pieces 41 and 42, and electrodes 31 and 32 which are preferably made from a food grade stainless steel. Spring 53 is also preferably made from a suitable spring steel rather than synthetic resin.

Methods

The invention includes novel methods for treating food products. The methods preferably include placing the food within a substantially confined treatment chamber, such as treatment chamber 33 described above. Placement of food within the chamber can be accomplished by removing the processing vessel 30 from the supporting electrifier 100 and opening the processing chamber. The opening step can be effected by removing the top mounting ring 37 and then removing the top electrode. Filling of chamber 33 is preferably accomplished so as to provide a relatively uniform thickness of food between the electrodes. This method of loading the treatment chamber is typically associated with treatment of solid and semi-solid foods.

Food can also be charged into the processing chamber 33 without removing the processing vessel by flowing the fluid food through ports 66 and 67 into and from the processing chamber. This can be accomplished using product pump 311.

The novel methods can also preferably include installing the processing vessel 30 within the supporting electrifier 100. This is advantageously done by resting the assembled processing vessel in the rest piece 26, such as by placing the processing vessel into the rest piece receptacle 27 in the orientation shown in FIG. 1. The methods can also advantageously include inserting the processing vessel into the processing bay 99, such as by inserting the rest and supported processing vessel 30 thereinto.

In the preferred embodiment, the installing step is preceded by displacing the second electrode contact and support member 42 downwardly. This displacing step can be effected by forcing the lever arm 171 downwardly and causing the contact and support member 42 to move downwardly, such as by sliding the member 42 downwardly. This downward displacement facilitates easy installation of the processing vessel.

Methods according to this invention also preferably include positioning and aligning the processing vessel electrode contact surfaces 101 and 102 to effect alignment and juxtaposition of the contact surfaces with the complementary contacting surfaces on the heads of the first and second contact and support members 41 and 42.

The preferred operation of processing machine 10 also includes preloading the processing vessel. This is done by releasing the lever arm 171 and causing the biasing spring 53 to preload the processing vessel. This preloading of the processing vessel loads the complementary contacting surfaces of the contact members 41 and 42 with contacting surfaces 101 and 102 of the first and second electrodes. This serves by forcing the complementary contacting surfaces to assure good electrical conduction.

The preloading step also functions by effectively setting a predetermined relief pressure threshold which must be overcome by internal pressures within the processing chamber to cause pressure relief.

The methods also preferably include charging the first and second electrodes to differing electrical potentials, such as by using pulse forming circuit 150. The charging process may be effected by varying the voltage of one or both electrodes. As shown, circuit 150 maintains the second electrode at a ground potential and swings the voltage of the first electrode alternately to both positive and negative electrical potentials. The charging to differing potentials creates an electric field between the electrodes which are preferably controlled to have changing polarity. Charging is preferably accomplished so as to produce field strengths in the approximate range of 20–100 kilovolts per centimeter. The preferred circuit is designed to alter the field polarity in sequentially alternating fashion with a positive polarity field being followed by a negative polarity field, and vice versa. Although a sequentially alternating field operational scheme is preferred, it is alternatively possible to use other operational schemes. In general it is preferred to apply approximately equal amounts of treatment with positive polarity fields as is applied with negative polarity fields. This approximate equality of positive and negative treatment helps to reduce electrode fouling which otherwise occurs.

The charging of the electrodes is preferably done so as to produce brief pulses which have an approximately square wave form. The charging step can be effected by generating positive polarity pulses from the pulse forming circuit and by generating negative polarity pulses from the pulse forming circuit. The generating process works by essentially charging the capacitors of circuit 150 while the switches 141 and 142 are nonconductive. Upon closure of either switch, the electrical energy stored in the capacitors associated with that switch are discharged through the inductors and supplied to the first electrode. The associated inductors regulate the rate of discharge so that a square wave form is advantageously developed. Thus the energy delivered across the electrode pair 31 and 32 is brought relatively rapidly to a desired voltage gradient and maintained at approximately the same voltage gradient during the pulse application period. The pulse durations and frequency preferred in the methods according to this invention are described above.

The alternating polarity fields preferably used in this invention are believed to be more effective than unipolar fields which might otherwise be applied. Although it is not known with certainty, it is believed that by sequentially alternating the polarity of the applied electrical fields there is an enhanced inhibition of microbial activity. It is hypothesized that such enhanced inhibitory effect on microbes may be due to field intensity enhancement. Field intensity enhancement may occur because of the polar nature of water molecules and other molecules present in the food being treated. The application of one electrical field causes the polar molecules in the food to become aligned in an orientation opposite the polarity of the applied electric field. When the next pulse is applied to the electrodes, the electric field orientation reverses and the polar molecules within the food are oriented in a manner which intensifies the applied electrical field until the polar molecules can reorient. Since it takes time to reorient, the applied treatment field is intensified and the microbes present in the food being treated are subjected to the intensified field strength.

The methods according to this invention are carried out by applying multiple electrical field applications during a treatment session. The number of pulses applied will vary dependent upon the system and the type of food product being treated. Treatment sessions having 2–100 positive and negative pulses will typically provide adequate inhibiting effect upon microbes.

Methods according to this invention also preferably including controlling the processing vessel temperature. Temperature is typically controlled within the approximate range of 0°–40° C., more preferably in the approximate range of 4°–20° C. This is advantageously done by circulating or otherwise supplying a heat transfer fluid to the processing chamber, such as by circulating water of desired temperature through the electrode cavities 181 and 182.

EXAMPLE

Skim milk can be treated using a processing apparatus as described above. Preferred field strength would be approximately 50 kilovolts per centimeter. Pulses having a pulse duration of 3 microseconds would be applied so as to effect 5 positive and 5 negative pulses per second. Total treatment would include 40 positive and 40 negative pulses. Temperature within the processing chamber would be monitored to assure that the milk would not be heated above 40° C. during the processing. If temperatures exceed this operational limit temperature level then pulses would be suspended until heat had dissipated. Circulating water would be controlled to 15° C. and passed through the electrode cooling cavities 181. Processing according to this treatment scheme would produce a significant decrease in viable microbes and enhance the shelf life of the skim milk being treated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A processor for treating foods with pulsed electrical fields, comprising:

a frame;

a processing vessel mounted to said frame; said processing vessel substantially enclosing a treatment chamber formed therein;

a first electrode having a first electrode face which faces the treatment chamber;

a second electrode having a second electrode face which faces the treatment chamber and is in spaced relationship to said first electrode face with portions of the treatment chamber between the first and second electrode faces;

a treatment chamber pressure relief which relieves pressure developed within the treatment chamber when pressure within the treatment chamber reaches an elevated relief pressure threshold.

2. A processor according to claim 1 and further comprising at least one temperature control subsystem which is connected to the flow-through processor and is capable of controlled flow of heat relative to the treatment chamber to affect temperature of the treatment chamber.

3. A processor according to claim 1 and further comprising at least one temperature control subsystem which is connected to the flow-through processor and is capable of controlled flow of heat relative to the treatment chamber to affect temperature of the treatment chamber; said at least one temperature control subsystem including at least one heat transfer channel formed to convey a heat transfer fluid adjacent to at least one electrode.

4. A processor according to claim 1 and further comprising a pulse forming circuit for generating electrical pulses which are conducted to the first and second electrodes.

5. A processor according to claim 1 and further comprising a pulse forming circuit for generating electrical pulses which are conducted to the first and second electrodes, said pulse forming circuit functioning to produce electrical pulses over time which charge the first and second electrodes to both positive and negative relative polarities.

6. A processor according to claim 1 and further comprising a pulse forming circuit for generating electrical pulses which are conducted to the first and second electrodes, said pulse forming circuit functioning to produce electrical pulses over time which charge the first and second electrodes to sequentially alternating positive and negative relative polarities.

7. A processor according to claim 1 wherein said treatment chamber pressure relief includes at least one movable electrode which is in movable relationship relative to other portions of the processing vessel.

8. A processor according to claim 1 wherein said treatment chamber pressure relief includes:

at least one movable electrode which is in movable relationship relative to other portions of the processing vessel;

a relief biasing part for biasing against pressure release from the treatment chamber until said relief pressure threshold is produced.

9. A processor according to claim 1 wherein said treatment chamber pressure relief includes at least one movable electrode support which supports at least one of said electrodes in movable relationship with remaining portions of the processing vessel.

10. A processor according to claim 1 wherein said treatment chamber pressure relief includes:

at least one movable electrode which is in movable relationship relative to other portions of the processing vessel;

at least one movable electrode support which supports said at least one movable electrode;

a relief biasing part for biasing against pressure release from the treatment chamber until said relief pressure threshold is produced.

11. A processor according to claim 1 wherein said treatment chamber pressure relief includes a relief biasing part for biasing against pressure release from the treatment chamber until said relief pressure threshold is produced.

12. A processor according to claim 1 wherein said treatment chamber pressure relief comprises a biasing spring.

13. A processor according to claim 1 wherein said treatment chamber pressure relief includes at least one movable electrode support which supports at least one of said electrodes in movable relationship relative to other portions of the processing vessel, said movable electrode support being slidably mounted relative to the frame.

14. A processor according to claim 1 wherein said treatment chamber pressure relief includes:

at least one movable electrode which is in movable relationship relative to other portions of the processing vessel;

at least one movable electrode support which supports said at least one movable electrode, said movable electrode support being slidably mounted relative to the frame;

a relief biasing part for biasing against pressure release from the treatment chamber until said relief pressure threshold is produced.

15. A processor according to claim 1 and further comprising:

a first electrode contact support which is electrically conductive and supported by said frame; said first electrode contact support engaging an outside surface of the first electrode to support the first electrode and conduct electrical current relative to said first electrode;

a second electrode contact support which is electrically conductive and movably supported by said frame; said second electrode contact support engaging an outside surface of the second electrode to support the second electrode and conduct electrical current relative to said second electrode.

16. A processor according to claim 1 wherein the processing vessel is a detachable module.

17. A processor according to claim 1 wherein the first and second electrode faces are spaced and parallel.

18. A processor according to claim 1 wherein the processing vessel has a movable wall which functions as part of the treatment chamber pressure relief by moving relative to other portions of the processing vessel.

19. A processor according to claim 1 wherein the processing vessel has a movable wall which functions as part of the treatment chamber pressure relief by moving relative to other portions of the processing vessel; and further comprising a relief biasing part for biasing against pressure release from the treatment chamber until said relief pressure threshold is produced.

20. A processor according to claim 1 wherein the processing vessel has a movable wall which functions as part of the treatment chamber pressure relief by moving relative to other portions of the processing vessel;

and further comprising:

a relief biasing part for biasing against pressure release from the treatment chamber until said relief pressure threshold is produced;

a biasing part displacer for displacing the biasing part to facilitate installation of the processing vessel.

21. A processor for treating foods with pulsed electrical fields, comprising:

a) a modular processing vessel detachably supportable within the supporting electrifier; said processing vessel substantially enclosing a treatment chamber formed therein and comprising:

a first electrode having a first electrode face which faces the treatment chamber;

a second electrode having a second electrode face which faces the treatment chamber and is in spaced relationship to said first electrode face with portions of the treatment chamber between the first and second electrode faces;

a movable processing vessel wall which is in movable relationship relative to other portions of the processing vessel;

b) a supporting electrifier which receives and supports the modular processing vessel, comprising:

a frame;

a treatment chamber pressure relief which engages the movable processing vessel wall to relieve pressure developed within the treatment chamber when pressure within the treatment chamber reaches an elevated relief pressure threshold.

22. A processor according to claim 21 and further comprising at least one temperature control subsystem which is connected to the flow-through processor and is capable of controlled flow of heat relative to the treatment chamber to affect temperature of the treatment chamber.

23. A processor according to claim 21 and further comprising at least one temperature control subsystem which is connected to the flow-through processor and is capable of controlled flow of heat relative to the treatment chamber to affect temperature of the treatment chamber; said at least one temperature control subsystem including at least one heat transfer channel formed to convey a heat transfer fluid adjacent to at least one electrode.

24. A processor according to claim 21 wherein the first and second electrode faces are spaced and parallel.

25. A processor according to claim 21 wherein said treatment chamber pressure relief includes a relief biasing part for biasing against pressure release from the treatment chamber until said relief pressure threshold is produced.

26. A processor according to claim 21 wherein said treatment chamber pressure relief includes a relief biasing part for biasing against pressure release from the treatment chamber until said relief pressure threshold is produced; and wherein said movable processing vessel wall is an electrode which is in movable relationship relative to other portions of the processing vessel.

27. A processor according to claim 21 wherein said treatment chamber pressure relief includes at least one movable electrode support which supports at least one of said electrodes in movable relationship with remaining portions of the processing vessel.

28. A processor according to claim 21 wherein said treatment chamber pressure relief includes:

at least one movable support which supports said movable processing vessel wall;

a relief biasing part for biasing against pressure release from the treatment chamber until said relief pressure threshold is produced.

29. A processor according to claim 21 wherein said treatment chamber pressure relief comprises a biasing spring.

30. A processor according to claim 21 wherein said treatment chamber pressure relief includes at least one movable support which supports said movable processing vessel wall in movable relationship relative to other portions of the processing vessel, said movable support being slidably mounted relative to the frame.

31. A processor according to claim 21 wherein said treatment chamber pressure relief includes:

at least one movable support which supports said movable processing vessel wall in movable relationship relative to other portions of the processing vessel, said movable support being slidably mounted relative to the frame;

a relief biasing part for biasing against pressure release from the treatment chamber until said relief pressure threshold is produced.

32. A processor according to claim 21 and further comprising:

a first electrode contact support which is electrically conductive and supported by said frame; said first electrode contact support engaging an outside surface of the first electrode to support the first electrode and conduct electrical current relative to said first electrode;

a second electrode contact support which is electrically conductive and movably supported by said frame; said second electrode contact support engaging an outside surface of the second electrode to support the second electrode and conduct electrical current relative to said second electrode.

33. A processor according to claim 21 and further comprising a pulse forming circuit for generating electrical pulses which are conducted to the first and second electrodes.

34. A processor according to claim 21 and further comprising a pulse forming circuit for generating electrical pulses which are conducted to the first and second electrodes, said pulse forming circuit functioning to produce electrical pulses which charge the first and second electrodes to both positive and negative relative polarities.

35. A processor according to claim 21 and further comprising a pulse forming circuit for generating electrical pulses which are conducted to the first and second electrodes, said pulse forming circuit functioning to produce electrical pulses which charge the first and second electrodes to sequentially alternating positive and negative relative polarities.

36. A processor according to claim 21 and further comprising:

a relief biasing part for biasing against pressure release from the treatment chamber until said relief pressure threshold is produced;

a biasing part displacer for displacing the biasing part to facilitate installation of the processing vessel.

* * * * *

UNITED STATES PATENT AND TRADEMARK OFFICE
CERTIFICATE OF CORRECTION

PATENT NO.    : 5,549,041
DATED         : August 27, 1996
INVENTOR(S)   : Zhang et al.

It is certified that error appears in the above-identified patent and that said Letters Patent is hereby corrected as shown below:

Column 1,
Line 5, after the title, insert:
             -- GOVERNMENTAL RIGHTS
      This invention was made with government support under Contract No. DAAK60-92-C0099 awarded by United States Army Department of Defense. The Government has certain rights in this invention. --.

Signed and Sealed this

First Day of October, 2002

*Attest:*

*Attesting Officer*

JAMES E. ROGAN
*Director of the United States Patent and Trademark Office*